United States Patent
Hernacki

(10) Patent No.: US 8,522,343 B2
(45) Date of Patent: Aug. 27, 2013

(54) REMOVING AN ACTIVE APPLICATION FROM A REMOTE DEVICE

(75) Inventor: Brian Hernacki, San Carlos, CA (US)

(73) Assignee: Palm, Inc., Sunnyvale, CA (US)

( * ) Notice: Subject to any disclaimer, the term of this patent is extended or adjusted under 35 U.S.C. 154(b) by 312 days.

(21) Appl. No.: 12/643,804

(22) Filed: Dec. 21, 2009

(65) Prior Publication Data

US 2011/0154491 A1    Jun. 23, 2011

(51) Int. Cl.
*H04L 29/06* (2006.01)

(52) U.S. Cl.
USPC ........... 726/21; 455/410; 455/411; 455/418; 455/425; 726/1; 726/23; 726/26; 726/28; 726/29; 726/30; 726/35; 713/100; 713/166; 713/175; 713/182; 713/193

(58) Field of Classification Search
USPC .............. 455/425, 410, 411, 418; 726/1, 726/21, 23, 26, 28–30, 35; 713/100, 166, 713/175, 182, 193
See application file for complete search history.

(56) References Cited

U.S. PATENT DOCUMENTS

| | | | |
|---|---|---|---|
| 6,343,333 B1 | 1/2002 | Matsumoto et al. | |
| 6,970,917 B1 * | 11/2005 | Kushwaha et al. | 709/217 |
| 7,684,792 B2 * | 3/2010 | Lundblade et al. | 455/425 |
| 8,056,143 B2 * | 11/2011 | Brown et al. | 726/29 |
| 2002/0142762 A1 * | 10/2002 | Chmaytelli et al. | 455/418 |
| 2009/0292710 A1 | 11/2009 | Casey | |
| 2010/0064341 A1 * | 3/2010 | Aldera | 726/1 |
| 2010/0251000 A1 * | 9/2010 | Lyne et al. | 714/2 |
| 2010/0299376 A1 * | 11/2010 | Batchu et al. | 707/955 |

FOREIGN PATENT DOCUMENTS

| | | |
|---|---|---|
| WO | WO-2008050439 A1 | 5/2008 |
| WO | WO-2009074956 A1 | 6/2009 |

* cited by examiner

*Primary Examiner* — Jeffrey Pwu
*Assistant Examiner* — Hee Song

(57) ABSTRACT

A system and a method are disclosed for managing applications on a mobile computing device. A command message is received at the mobile computing device specifying a command and a target application. The command message may have been sent by a application provider server. The command may be a removal command, an enable command, or a disable command. A removal or disable command may be used to remove or disable a problematic target application. The specified command is performed on the target application.

13 Claims, 5 Drawing Sheets

REMOVING AN ACTIVE APPLICATION FROM A REMOTE DEVICE

BACKGROUND

1. Field of Art

The disclosure generally relates to the field of managing applications on client devices.

2. Description of Art

It is often desirable to prevent problematic applications from being installed and executed on a mobile computing device. Problematic applications include, for example, applications containing malware, applications having many faults or defects ("buggy" applications), or applications that violate various standards or guidelines. An application provider may attempt to test applications to determine if they are problematic before making them available to users for download and installation on their mobile computing devices. However, if there are a large number of applications, it may be difficult to fully test every application before making it available to users.

If an application is determined to be problematic after it has been made available, the application provider can prevent additional users from downloading the application. However, some users may have already downloaded and installed the application. The application provider can send out a warning to these users (or to all users) telling them to remove the application from their devices. However, such warnings are often ignored by users and the applications often continue to be used in the devices.

There is lacking, inter alia, a system and method to effectively prevent users from using problematic applications on their computing device.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium is configured to manage applications on a computing device, e.g., a mobile computing device. A command message is received at the mobile computing device specifying a removal command and a target application. The mobile computing device verifies that the command message originated from a recognized application provider by checking a digital signature of the command message. The target application is then removed from the mobile computing device by deleting the target application files from the mobile computing device and updating configuration settings on the mobile computing device to indicate that the target application has been removed. A result message is sent specifying whether the removal of the target application was successful.

In one embodiment an application provider manages applications on mobile computing devices. An application provider server receives an indication of a problematic application. The server queries a database to determine a mobile computing device that has the problematic application installed. A command message is created that specifies a removal command and the problematic application. A digital signature is added to the command message indicating that the command message originated with the application provider. The command message is sent to the mobile computing device and a result message is received from the device indicating the success of the command. The application provider server updates the database to indicate that the problematic application is no longer installed on the mobile computing device.

Example Mobile Computing Device

Figure 1B:
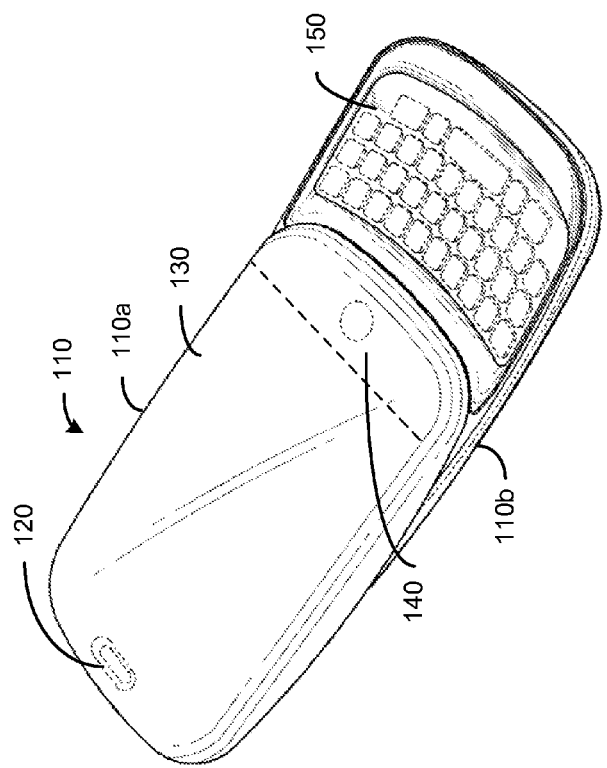
FIG. 1b illustrates one embodiment of the mobile computing device in a second positional state.
Figure 1A:
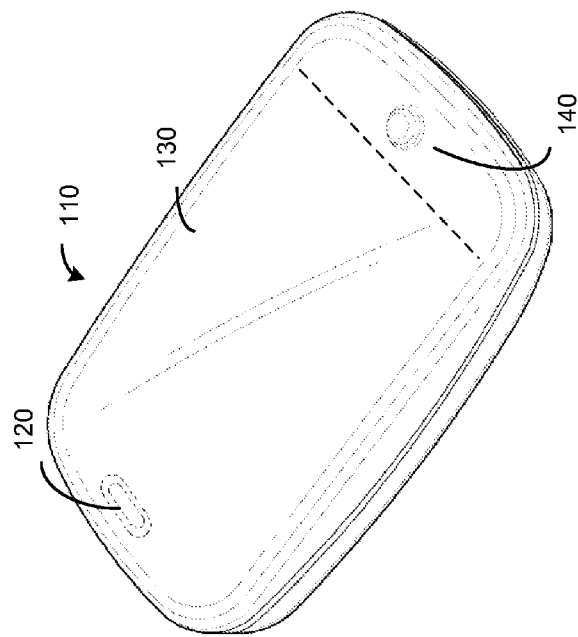
FIG. 1a illustrates one embodiment of a mobile computing device in a first positional state.

In one example embodiment, the configuration as disclosed may be configured for use between a mobile computing device, that may be a host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
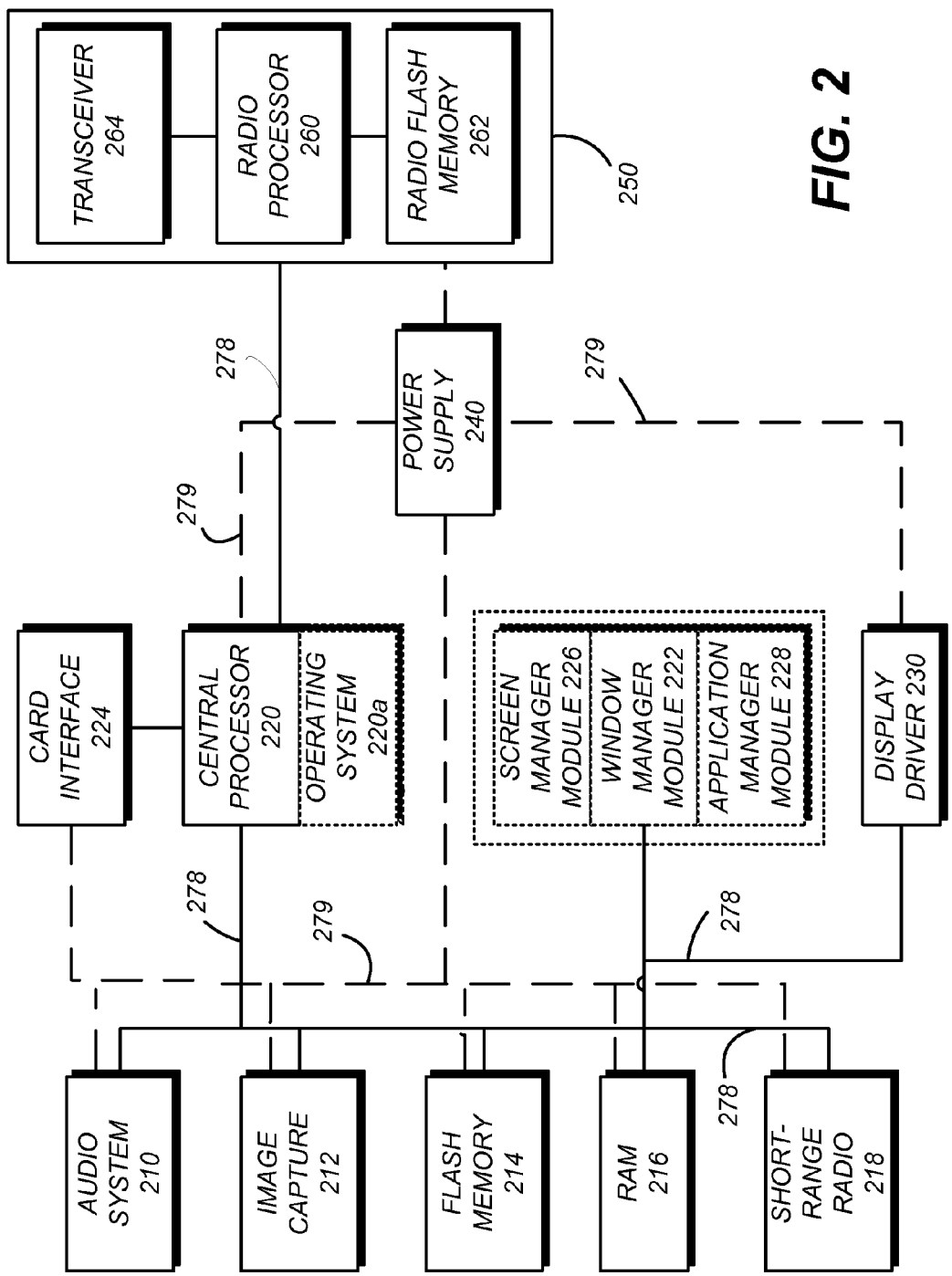
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An application manager module 228 comprises software that is, for example, integrated with the operating system or configured to be an application operational with the operating system. In some embodiments it may comprise firmware, for example, stored in the flash memory 214. The application manager module 228 is configured to remove, enable, or disable software applications that have been installed in the mobile computing device 110. Removing an application may comprise deleting the files associated with the application from the flash memory 214. Enabling or disabling an application may comprise changing configuration settings in the mobile computing device 110 that allow or disallow the application from being executed. The application manager receives commands for removing, enabling, or disabling software applications from an external application provider.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Managing Applications on Mobile Computing Devices

Figure 3:
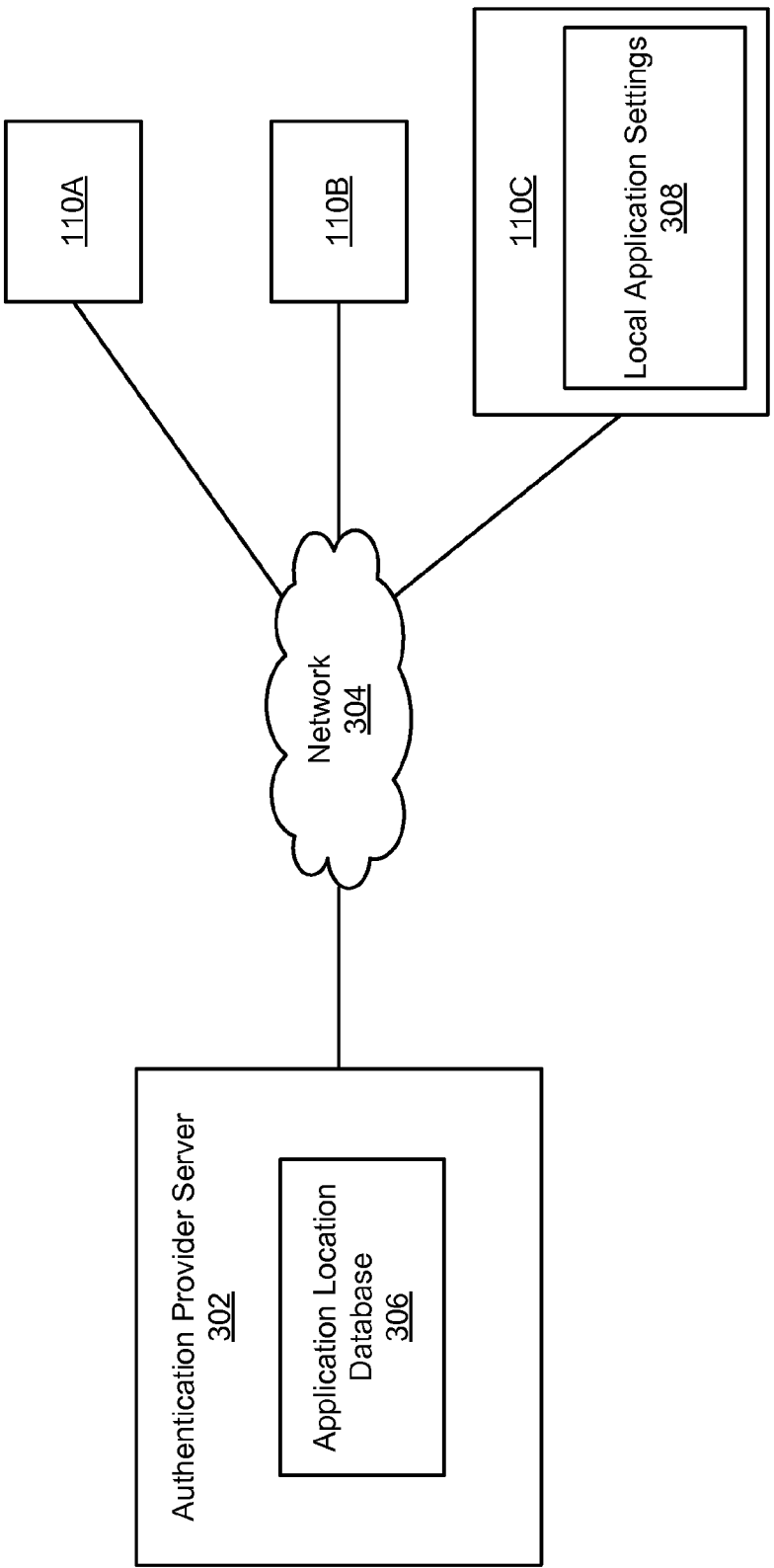
FIG. 3 is a high-level diagram illustrating one embodiment of an environment including an application provider server for communicating with mobile computing devices.

FIG. 3 is a high-level diagram illustrating one embodiment of an environment including an application provider server for communicating with one or more mobile computing devices (e.g., the mobile computing device 110). The application provider server 302 is operated by an application provider that makes applications (e.g., games, utilities) available to mobile computing devices 110. In one embodiment, users of mobile computing devices 110 can download and install applications from the application provider server 302 to their devices. The application files may be installed on the flash memory 214 of the devices. The users can then run the applications on their mobile computing devices. The network 304 may include various combinations of networks such as wireless networks, cellular networks, and the Internet. Though only three mobile computing devices are shown, there may be thousands or more such devices obtaining applications from the application provider server.

The application provider server 302 may provide many different applications to the mobile computing devices 110. The application provider server can keep track of the applications that have been provided in the application location database 306. Each time an application is downloaded to (or installed on) a mobile computing device 110, the application location database 306 can be updated with the identity of the device and the identity of the application, including the application version. The identity of the device can be a phone number of the device, a serial number of the device, or any other device identifier.

Each mobile computing device 110 includes local application settings 308, in one embodiment. The local application settings 308 can indicate which applications are installed on the mobile device and can be updated whenever an application is installed or uninstalled. The local application settings 308 may also indicate whether each installed application is currently enabled or disabled. By default, each installed application can be enabled, but it may be useful to sometimes disable an application as described below. The local application settings can be stored on the flash memory 214 of the mobile computing device.

Figure 4:
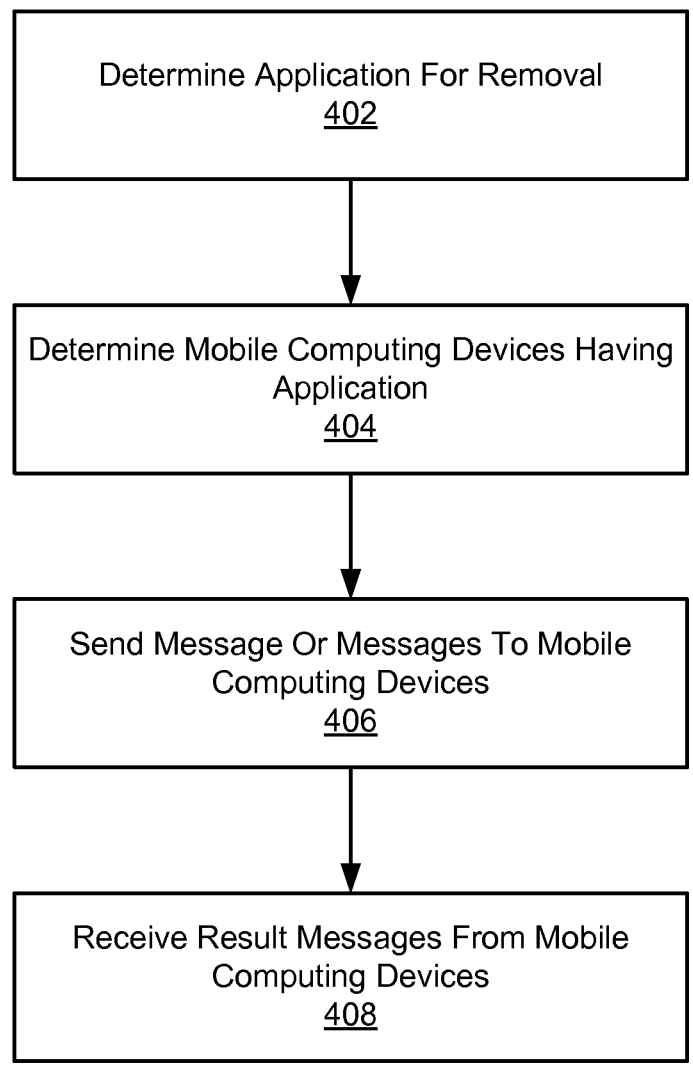
FIG. 4 is a flowchart illustrating one embodiment of a method for an application provider server to manage applications on mobile computing devices.

FIG. 4 is a flowchart illustrating one embodiment of a method for an application provider server to manage applications on one or more mobile computing devices (e.g., the mobile computing device 110). Initially, the application provider determines 402 an application for removal from the one or more mobile computing devices. This application, referred to as a problematic application or a target application, is generally an application that has been previously available for download and installation. The application provider may desire to remove the application because it has recently been found to contain malware or software bugs. The application may also be problematic or undesirable, and thus targeted for removal, for other reasons, for example, because the application does not meet a particular quality or design standard, particular operational guidelines, or violates other functional properties.

The application provider server determines 404 which mobile computing devices have the application installed. This may be done by querying the application location database 306 with the identity of the application. The application provider server then sends 406 a command message or messages to mobile computing devices 110 that have the application installed. The command message includes an application identifier that is understood by the mobile computing devices (e.g., the name and version of the application). The command message also includes a command type, such as a removal (or uninstall) command. Other command types are discussed below. The message may also include a unique identifier corresponding to the particular application and command type. The message may be cryptographically signed (e.g., using RSA or some similar asymmetric method) by a private key maintained by the application provider. The message may also be encrypted.

Individual command messages may be sent to each mobile computing device that has the application installed. Messages may be sent to a group of devices that are likely to have the application installed. In one embodiment, a broadcast message may be sent to all mobile computing devices 110 regardless of whether they have the application installed. In this case, it is not necessary for the application provider server 302 to maintain an application location database 306 tracking the use of the application. It may also be useful to send a broadcast message if it is possible for devices to obtain the application from sources other than the application provider, in which case the application location database 306 would not have knowledge of all devices having the application.

The message may be sent using any protocol, such as the Extensible Messaging and Presence Protocol (XMPP) or Short Message Service (SMS) protocol. Various push capable messaging protocols may be used that allow the message to be sent to mobile computing devices 110 when desired by the application provider. In one embodiment, the push capable messaging protocol is directed, provides origin information, and can carry a sufficiently large payload. Messages can be queued for delivery to the devices.

Figure 5:
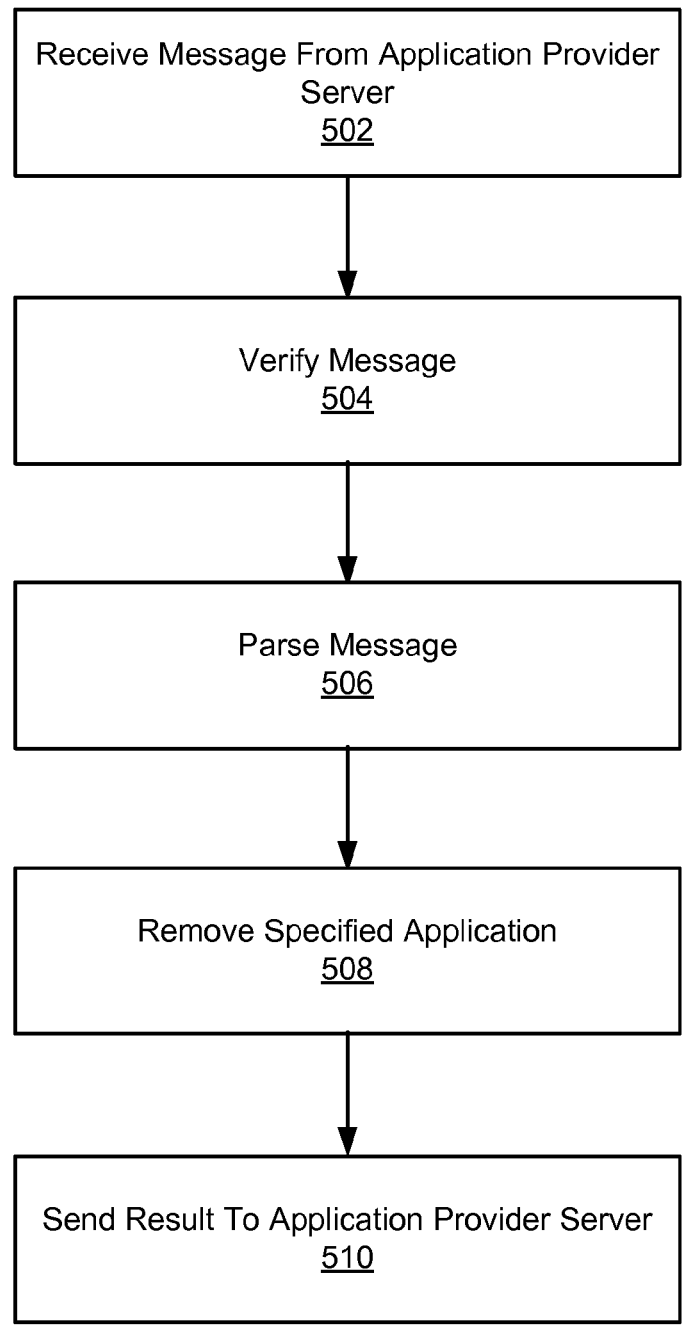
FIG. 5 is a flowchart illustrating one embodiment of a method for a mobile computing device to manage its applications.

FIG. 5 is a flowchart illustrating one embodiment of a method for a mobile computing device to manage its applications. The method in FIG. 5 may be carried out by the application manager module 228. The application manager module 228 receives 502 a command message from the application provider server 302. The message may be received from the network 304 through the radio subsystem 250 of the mobile computing device 110. The application manager module 228 verifies 504 the message by verifying the signature of the message to ensure that the message has been sent by an approved application provider. The verification can be performed using a public key that has been pre-provisioned to the device. This prevents spoofing attacks on mobile computing devices where attackers send messages instructing the devices to remove properly functioning applications. The application manager module 228 may also decrypt the message if necessary.

The application manager module 228 parses 506 the message. This includes determining the command type, the target application, and the unique identifier. The application manager module 228 has knowledge of (or determines) the message format used by the application provider server. If the command type is a removal command, then the application manager module 228 removes the target application.

The application manager module 228 can remove (or uninstall) the target application by removing the files associated with the application from the flash memory 214 so that the application can no longer execute or otherwise affect the mobile computing device 110. The application manager may also remove any record of the application from the local application settings 308. If the application is currently running, the application can be immediately halted (e.g., the application process can be "killed" or "terminated"). The application manager module 228 may alert the user that the application has been removed and optionally provide a message indicating a reason for removal.

In one embodiment, the application manager module 228 sends (or transmits) 510 a result to the application provider server 302. The result indicates a status of the remove operation, such as whether the removal was successful or not. Possible reasons for an unsuccessful removal include the application not being installed on the mobile computing device or failing to locate or remove all of the application files. The result may be sent in a message, referred to as a result message, that also contains the unique identifier that was contained in the message from the application provider server 302. The result message may be sent using the Hypertext Transfer Protocol (HTTP) or various other protocols. If the network 304 is not currently available, the result message may be enqueued to be sent later. In one embodiment, a result message indicating a failure is not sent to the application service provider if the original command message was a broadcast message.

Returning to FIG. 4, in step 408 the application provider server 302 receives the result message from the mobile computing device 110. If the result indicated a success, the application location database 306 can be updated to indicate that the application is no longer installed on the mobile computing device. If the result indicated a failure, the application provider server 302 can attempt to re-send the message or update the application location database 306 as appropriate. In some cases, such as when the initial message was sent to all mobile computing devices (including those not having the application), the application provider server 302 may ignore certain results indicating failure. The application provider server 302 may use the unique identifier contained in the result message to match the message to the corresponding initial command message.

In one embodiment, enable and disable commands may also be sent from the application provider server 302 to the mobile computing devices (e.g., 100) in command messages. A disable command causes the target application to be prevented from executing on the mobile computing device but does not remove the application from the device. An enable command reverses a disable command and allows the application to execute.

Disabling an application may be preferable to removing the application because disabling can be more easily reversed. For example, if the application provider suspects a target application of containing malware but is not certain that it contains malware, the application provider can disable the target application on the mobile computing devices until further testing is completed. The application provider can then send a message to re-enable the target application or to remove it depending on the results of the testing. Disabling an application may also be used to immediately halt the use of a target application while the slower process of removal is performed later.

The process of enabling or disabling an application is functionally similar to the process described above for removing an application. The command type in the command message is an enable command or disable command. In addition to keeping track of which applications are installed on the mobile computing devices, the application location database 306 can also keep track of which applications are currently enabled and disabled on the devices.

When a mobile computing device 110 receives an enable or disable command, it can update the local application settings 308 on the device to specify whether the target application is enabled or disabled. Whenever a user attempts to execute an application on the device, the local application settings 308 can be checked to ensure that the application is currently enabled before allowing the application to execute. If an application is currently executing and a disable command is received, the application can be immediately halted (e.g., the application process can be killed).

The disclosed embodiments beneficially allow for rapidly and automatically removing, disabling, or enabling applications on a mobile computing device without the involvement of the user of the device. If malware or other problems are discovered in an application that is currently installed on many mobile computing devices, the possible harm from the application can be mitigated by rapidly and automatically removing or disabling the application at the devices.

Additional Configuration Considerations

Some portions of above description describe the embodiments in terms of algorithms and symbolic representations of operations on information, for example, as illustrated and described with respect to FIGS. 2-5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for removing or disabling applications at mobile computing devices through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing applications on a mobile computing device, the method being performed by one or more processors and comprising:

receiving a first command message from a server to disable a target application;

performing a verification that the first command message originated from the server, the verification comprising checking a digital signature of the first command message;
disabling the target application in response to verifying that the first command message originated from the server;
receiving a second command message from the server, the second command message specifying the target application to be re-enabled or removed;
determining whether the second command message is a command to re-enable the target application or a command to remove the target application; and
performing an operation corresponding to the determination.

2. The method of claim 1, wherein the target application has been identified as a problematic application by the server.

3. The method of claim 1, wherein the operation corresponding to the second command message comprises removing one or more files of the target application from a memory of the computing device, and further comprising:
in response to removing the one or more files of the target application, sending a result message to the server indicating that the removal of the one or more files was successful.

4. The method of claim 3, further comprising:
updating a configuration setting of the mobile computing device to indicate that the one or more files of the target application have been removed.

5. A non-transitory computer readable medium that stores instructions for managing applications on a computing device, including instructions that when executed by one or more processors, cause the one or more processors to perform operations comprising:
receiving a first command message from a server to disable a target application;
performing a verification that the first command message originated from the server, the verification comprising checking a digital signature of the first command message;
disabling the target application in response to verifying that the first command message originated from the server;
receiving a second command message from the server, the second command message specifying the target application to be re-enabled or removed;
determining whether the second command message is a command to re-enable the target application or a command to remove the target application; and
based on the determination, performing one of (i) re-enabling the target application, or (ii) removing one or more files of the target application from a memory of the computing device.

6. The non-transitory computer readable medium of claim 5, further comprising instructions that cause the processor to perform:
in response to removing the one or more files of the target application, sending a result message to the server indicating that the removing of the one or more files was successful.

7. The non-transitory computer readable medium of claim 5, further comprising instructions that cause the processor to perform:
updating a configuration setting of the computing device to indicate that one or more files of the target application have been removed.

8. The non-transitory computer readable medium of claim 5, wherein the target application has been identified as a problematic application by the server.

9. A system for managing applications on a computing device, comprising:
a server; and
a computing device comprising one or more processors for executing instructions stored on a memory of the computing device, the instructions that when executed by the one or more processors cause the one or more processors to:
receive a first command message from a server to disable a target application;
perform a verification that the first command message originated from the server, the verification comprising checking a digital signature of the first command message;
disable the target application in response to verifying that the first command message originated from the server;
receive a second command message from the server, the second command message specifying the target application to be re-enabled or removed;
determine whether the second command message is a command to re-enable the target application or a command to remove the target application; and
perform an operation corresponding to the determination.

10. The system of claim 9, wherein the operation corresponding to the second command message comprises removing one or more files of the target application from a memory of the computing device, and further comprising instructions that when executed by the one or more processors cause the one or more processors to:
in response to removing the one or more files of the target application, send a result message to the server indicating that the removing of the one or more files was successful.

11. The system of claim 9, further comprising instructions that when executed by the one or more processors cause the one or more processors to:
update a configuration setting of the computing device to indicate that one or more files of the target application have been removed.

12. The system of claim 9, wherein the target application has been identified as a problematic application by the server.

13. A method to manage applications on a computing device, the method being performed by a server and comprising:
determining a target application stored on the computing device;
transmitting a first command message to the computing device, the first command message indicating a disable command to cause the computing device to disable the target application;
determining whether the target application should be re-enabled; and
in response to verifying that the first command message originated from the server, transmitting a second command message to the computing device, the second command message causing the computing device to remove the target application.

* * * * *